(12) United States Patent
Hamagishi et al.

(10) Patent No.: US 9,223,141 B2
(45) Date of Patent: Dec. 29, 2015

(54) DISPLAY PANEL AND DISPLAY APPARATUS HAVING THE SAME

(71) Applicant: SAMSUNG DISPLAY CO., LTD., Yongin, Gyeonggi-Do (KR)

(72) Inventors: Goro Hamagishi, Hwaseong-Si (KR); Se-Joon Oh, Suwon-Si (KR); Seung-Hoon Lee, Hwaseong-Si (KR); Seung-Jun Yu, Suwon-Si (KR); Sang-Min Jeon, Yongin-Si (KR); Kyung-Ho Jung, Seongnam-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 146 days.

(21) Appl. No.: 13/771,238

(22) Filed: Feb. 20, 2013

(65) Prior Publication Data

US 2014/0085719 A1 Mar. 27, 2014

(30) Foreign Application Priority Data

Sep. 27, 2012 (KR) ........................ 10-2012-0108060

(51) Int. Cl.
*G02B 27/22* (2006.01)
*G02B 27/14* (2006.01)
*H04N 13/04* (2006.01)

(52) U.S. Cl.
CPC ................ *G02B 27/14* (2013.01); *G02B 27/22* (2013.01); *G02B 27/2214* (2013.01); *H04N 13/0404* (2013.01); *H04N 13/0415* (2013.01)

(58) Field of Classification Search
None
See application file for complete search history.

(56) References Cited

U.S. PATENT DOCUMENTS

| 8,766,882 B2* | 7/2014 | Fukushima et al. | ............. 345/55 |
|---|---|---|---|
| 2008/0079662 A1* | 4/2008 | Saishu et al. | ...................... 345/55 |
| 2008/0225113 A1* | 9/2008 | Saishu et al. | ...................... 348/51 |

* cited by examiner

*Primary Examiner* — Jade R Chwasz
(74) *Attorney, Agent, or Firm* — F. Chau & Associates, LLC (57) ABSTRACT

A display panel includes a transmit-control portion and a light blocking portion. The pixel-transmit portion may include a pair of first sides and a pair of second sides and transmitting light, the pair of the first sides being inclined with respect to a horizontal-axis direction and substantially parallel with each other, the pair of the second sides being inclined with respect to a vertical-axis direction and substantially parallel with each other. The blocking portion may surround the pixel-transmit portion and block the light.

8 Claims, 9 Drawing Sheets

FIG. 4 tan θ ≦(i*tan p+j)/(i/2)

FIG. 5

$\tan \theta \leq (j - i*\tan q)/(i/2)$

DISPLAY PANEL AND DISPLAY APPARATUS HAVING THE SAME

This application claims priority under 35 U.S.C. §119 to Korean Patent Application No. 10-2012-0108060, filed on Sep. 27, 2012, the disclosure of which is incorporated by reference herein in its entirety.

TECHNICAL FIELD

Exemplary embodiments of the present invention relate to a display panel and a display apparatus including the display panel.

DISCUSSION OF THE RELATED ART

Three dimensional (3D) stereoscopic displays may be classified into a stereoscopic type and an auto-stereoscopic type according to whether specific glasses are needed. Auto-stereoscopic type displays, such as a barrier type, a lenticular type and so on, are used in flat displays. A lenticular-type 3D display uses lenticular lenses that refract light passing through a left-side pixel and a right-side pixel to an observer's left and right eyes, respectively, so that the observer may feel a 3D effect.

An auto-stereoscopic type display may cause changes in luminance depending on the distance between the display and an observer, the observer's position, the position of an image in the screen, and so on, and thus a stripe pattern may appear on the screen. Such phenomenon is referred to as Moiré. By reducing crosstalk between images, Moiré may be alleviated or removed.

SUMMARY

According to an exemplary embodiment of the present invention, a display panel includes a first pixel-transmit portion and a light blocking portion. The first pixel-transmit portion may include a pair of first sides and a pair of second sides and configured to transmit light. The pair of the first sides are inclined with respect to a horizontal-axis direction of the display panel and substantially parallel with each other, and the pair of the second sides are inclined with respect to a vertical-axis direction of the display panel and substantially parallel with each other. The blocking portion may surround the first pixel-transmit portion and is configured to block the light.

In an exemplary embodiment of the present invention, at least one of the first sides may be inclined in a first inclination direction with respect to the vertical-axis direction, and at least one of the second sides may be inclined in a second inclination direction opposite to the first inclination direction with respect to the vertical-axis direction In an exemplary embodiment of the present invention, the display panel further includes a second pixel-transmit portion adjacent to the first pixel-transmit portion in the horizontal-axis direction. The first and second pixel-transmit portions each may include first, second, third and fourth vertices, and the second vertex of the first pixel-transmit portion and the first vertex of the second pixel-transmit portion may be positioned on a first inclination line.

In an exemplary embodiment of the present invention, the display panel further includes a third pixel-transmit portion adjacent to the first pixel-transmit portion in the vertical-axis direction. The third pixel-transmit portion includes first, second, third, and fourth vertices. The first vertex of the first pixel-transmit portion and the second vertex of the third pixel-transmit portion may be positioned on a second inclination line substantially parallel with the first inclination line.

In an exemplary embodiment of the present invention, the first and second sides may have substantially the same inclination direction with respect to the vertical-axis direction.

In an exemplary embodiment of the present invention, the display panel further includes a second pixel-transmit portion adjacent to the first pixel-transmit portion in the horizontal-axis direction. The first and second pixel-transmit portions each may include first, second, third and fourth vertices. The second vertex of the first pixel-transmit portion and the first vertex of the second pixel-transmit portion may be positioned on a vertical line substantially parallel with the vertical-axis direction.

In an exemplary embodiment of the present invention, the display panel further includes a third pixel-transmit portion adjacent to the first pixel-transmit portion in the vertical-axis direction. The third pixel-transmit portion includes first, second, third, and fourth vertices. The first to fourth vertices of the first pixel-transmit portion and the first to fourth vertices of the third pixel-transmit portion may be positioned on vertical lines, which are substantially parallel with the vertical-axis direction.

According to an exemplary embodiment of the present invention, a display apparatus includes a lens plate and a display panel. The lens panel may include a plurality of unit lenses. The display panel may include a first pixel-transmit portion and a blocking portion, the first pixel-transmit portion including a pair of first sides inclined with respect to a horizontal-axis direction of the display panel and being substantially parallel with each other and a pair of second sides inclined with respect to a vertical-axis direction of the display panel and being substantially parallel with each other. The first pixel-transmit portion is configured to transmit light, and the blocking portion surrounding the pixel-transmit portion is configured to block the light.

In an exemplary embodiment of the present invention, at least one of the unit lenses may have a lens axis inclined with respect to the vertical-axis direction.

In an exemplary embodiment of the present invention, at least one of the first sides may have a first inclination direction opposite to a direction of the lens axis with respect to the vertical-axis direction, and at least one of the second sides may have a second inclination direction the same or substantially the same as the direction of the lens axis with respect to the vertical-axis direction.

In an exemplary embodiment of the present invention, the display apparatus further includes a second pixel-transmit portion adjacent to the first pixel-transmit portion in the horizontal-axis direction. The first and second pixel-transmit portions each may include first, second, third and fourth vertices. The second vertex of the first pixel-transmit portion and the first vertex of the second pixel-transmit portion may be positioned on a first inclination line substantially parallel with the lens axis.

In an exemplary embodiment of the present invention, the display apparatus further includes a third pixel-transmit portion adjacent to the first pixel-transmit portion in the vertical-axis direction. The third pixel-transmit portion includes first, second, third, and fourth vertices. The first vertex of the first pixel-transmit portion and the second vertex of the third pixel-transmit portion may be positioned on a second inclination line substantially parallel with the first inclination line.

In an exemplary embodiment, an angle θ between a vertical line perpendicular to the lens axis and a diagonal of the first pixel-transmit portion may be calculated by $$\tan\theta \le \frac{i\tan p + j}{\frac{i}{2}}.$$

j may be a distance between two lines parallel to the vertical line and passing through the second and fourth vertices, respectively, of the first pixel-transmit portion measured along the lens axis, i may be a distance between the lens axis and a line parallel to the lens axis and passing through the second vertex of the first pixel-transmit portion measured along a direction perpendicular to the lens axis, and p may be an angle between the vertical line and one of the first sides of the first pixel-transmit portion.

In an exemplary embodiment of the present invention, an angle θ between a vertical line perpendicular to the lens axis and a diagonal line of the first pixel-transmit portion may be calculated by $$\tan\theta \le \frac{j - i\tan q}{\frac{i}{2}}.$$

j may be a distance between the vertical line and a line parallel to the vertical line and passing through the third vertex of the first pixel-transmit portion measured along the lens axis, i may be a distance between the lens axis and a line parallel to the lens axis and passing through the second vertex of the first pixel-transmit portion measured along a direction perpendicular to the lens axis, and q may be an angle between the vertical line and one of the first sides of the pixel-transmit portion.

In an exemplary embodiment of the present invention, a spacing distance along a direction of the lens axis between the first pixel-transmit portion and a pixel transmit portion adjacent to each other in the direction of the lens axis may be substantially the same as a sum of a first spacing distance along the direction of the lens axis between the first and second pixel-transmit portions and a second spacing distance along the direction of the lens axis between the first and third pixel-transmit portions.

In an exemplary embodiment of the present invention, a lens axis of at least one of the unit lenses may be substantially parallel with the vertical-axis direction.

In an exemplary embodiment of the present invention, the first and second sides may have substantially the same inclination direction with respect to the vertical-axis direction.

In an exemplary embodiment of the present invention, the display apparatus further includes a second pixel-transmit portion adjacent to the first pixel-transmit portion in the horizontal-axis direction. The first and second pixel-transmit portions each include first, second, third and fourth vertices. The second vertex of the first pixel-transmit portion and the first vertex of the second pixel-transmit portion may be positioned on a vertical line substantially parallel with the vertical-axis direction.

In an exemplary embodiment of the present invention, the display apparatus further includes a third pixel-transmit portion adjacent to the first pixel-transmit portion in the vertical-axis direction, wherein the third pixel-transmit portion includes first, second, third, and fourth vertices. The first to fourth vertices of the first pixel-transmit portion and the first to fourth vertices of the third pixel-transmit portion may be positioned on vertical lines, which are substantially parallel with the vertical-axis direction.

In an exemplary embodiment of the present invention, an angle β between the horizontal-axis direction and one of the second sides of the first pixel-transmit portion may be calculated by $$\tan\beta \ge \frac{V}{\frac{H}{2}}.$$

H may be a distance between the lens axis and a line parallel to the lens axis and passing through the second vertex of the first pixel-transmit portion measured along the horizontal-axis direction, and V may be a distance between a horizontal axis and a line parallel to the horizontal axis and passing through the third vertex of the pixel-transmit portion measured along the vertical-axis direction.

According to an exemplary embodiment of the present invention, a display panel includes a pixel-transmit portion corresponding to a pixel electrode, in which the pixel-transmit portion includes two parallel first sides and two parallel second sides, in which the first sides are inclined by a first angle with respect to a horizontal axis of the display panel, and the second sides are inclined by a second angle with respect to a vertical axis of the display panel, and a blocking portion surrounding the pixel-transmit portion.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF EXEMPLARY EMBODIMENTS

Hereinafter, embodiments of the present invention will be described in detail with reference to the accompanying drawings.

The present invention may, however, be embodied in many different forms and should not be construed as being limited to the embodiments set forth herein. Like reference numerals may denote like or similar elements throughout the specification and the drawings.

It will be understood that when an element is referred to as being "on," "connected to" or "coupled to" another element, it can be directly on, connected to or coupled to the other element or intervening elements may be present.

As used herein, the singular forms "a," "an" and "the" are intended to include the plural forms as well, unless the context clearly indicates otherwise.

Figure 1:
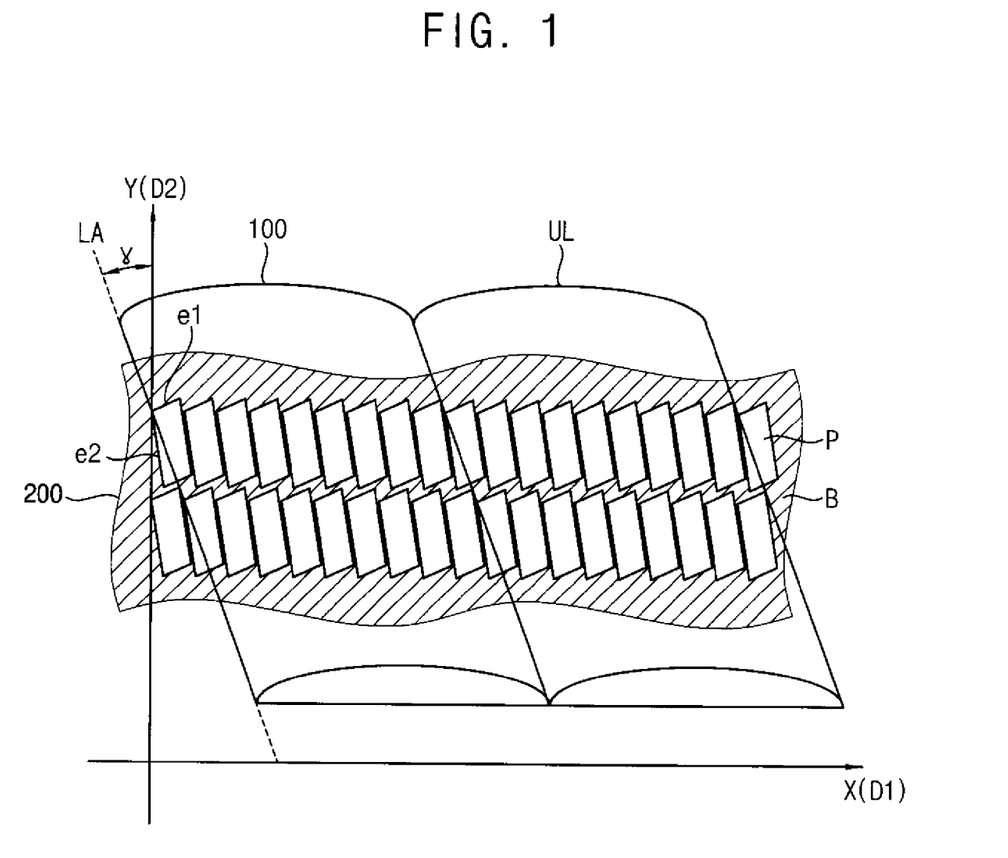
FIG. 1 is a perspective view illustrating a display apparatus according to an exemplary embodiment of the present invention.

FIG. 1 is a perspective view illustrating a display apparatus according to an exemplary embodiment of the present invention.

Referring to FIG. 1, the display apparatus may include a lens panel 100 and a display panel 200.

The lens panel 100 is disposed on the display panel 200 and includes a plurality of unit lens UL. Each of the unit lenses UL extends along a direction of a lens axis LA inclined by an inclination angle γ with respect to a vertical-axis direction Y and is arranged along a horizontal-axis direction X crossing the vertical-axis direction Y.

The inclination angle γ may be between about 0° and about 45. The unit lens UL has a lens width, and the lens width corresponds to a plurality of pixel-transmit portions having a preset multi-viewing point.

The unit lens UL refracts light passing through the pixel-transmit portion of the display panel 200 to positions corresponding to the multi-viewing point. The unit lens UL may include a Fresnel lens, a lenticular lens and so on.

The lens panel 100 may be a lens plate formed by patterning the unit lenses UL. Alternatively, the lens panel 100 may be an active liquid crystal ("LC") lens panel including a plurality of patterned electrodes and a liquid crystal layer for forming the unit lenses UL.

When the lens panel 100 is the lens plate, the display apparatus may display a three-dimensional ("3D") image. When the lens panel 100 is the active LC lens panel, the display apparatus controls the active LC lens panel to selectively display a two-dimensional ("2D") image and a 3D image.

The display panel 200 may include a plurality of pixel-transmit portions P and a blocking portion B surrounding each of the pixel-transmit portions P. A pixel-transmit portion P corresponds to an area where a pixel electrode is disposed in a pixel and controls a transmittance of light provided from a rear surface of the display panel 200 based on a data voltage applied to the pixel electrode. For example, a pixel may include a pixel-transmit portion P that may transmit light from a light source to the unit lens UL. The blocking portion B blocks the light provided from a rear surface of the display panel 200.

The blocking portion B includes at least one electronic element and at least one signal line to drive the pixel electrode. The electronic element may include a switching element, a storage capacitor and so on, and the signal line may include a data line, a gate line and so on. Alternatively, the transmit-control portions and the light blocking portion include at least one electronic element and at least one signal line.

Each of the pixel-transmit portions P includes a pair of first sides e1 parallel with each other and a pair of second sides e2 parallel with each other, and may have a parallelogrammic shape. The first sides extend along a direction inclined with respect to a horizontal-axis direction D1, and the second sides extend along a direction crossing the direction of the first sides and are inclined with respect to a vertical-axis direction D2. The first sides e1 have an inclination direction opposite to an inclination direction of the lens axis LA inclined with respect to the vertical-axis direction Y, and the second sides e2 have an inclination direction substantially the same as the inclination direction of the lens axis LA inclined with respect to the vertical-axis direction Y.

For example, as shown in FIG. 1, when the lens axis LA is inclined in a counterclockwise direction with respect to the vertical-axis direction Y, the first sides e1 are inclined in a clockwise direction, which is opposite to the inclination direction of the lens axis LA, with respect to the vertical-axis direction Y, and the second sides e2 are inclined in a counterclockwise direction, which is substantially the same as the inclination direction of the lens axis LA, with respect to the vertical-axis direction Y.

When the lens axis LA is inclined in the clockwise direction with respect to the vertical-axis direction Y, the first sides e1 are inclined in the counterclockwise direction, which is opposite to the inclination direction of the lens axis LA, with respect to the vertical-axis direction Y, and the second sides e2 are inclined in the clockwise direction, which is substantially the same as the inclination direction of the lens axis LA inclined, with respect to the vertical-axis direction Y.

Hereinafter, the first side e1 may be referred to as a shorter side of the pixel-transmit portion P, and the second side e2 may be referred to as a longer side of the pixel-transmit portion P.

Figure 2:
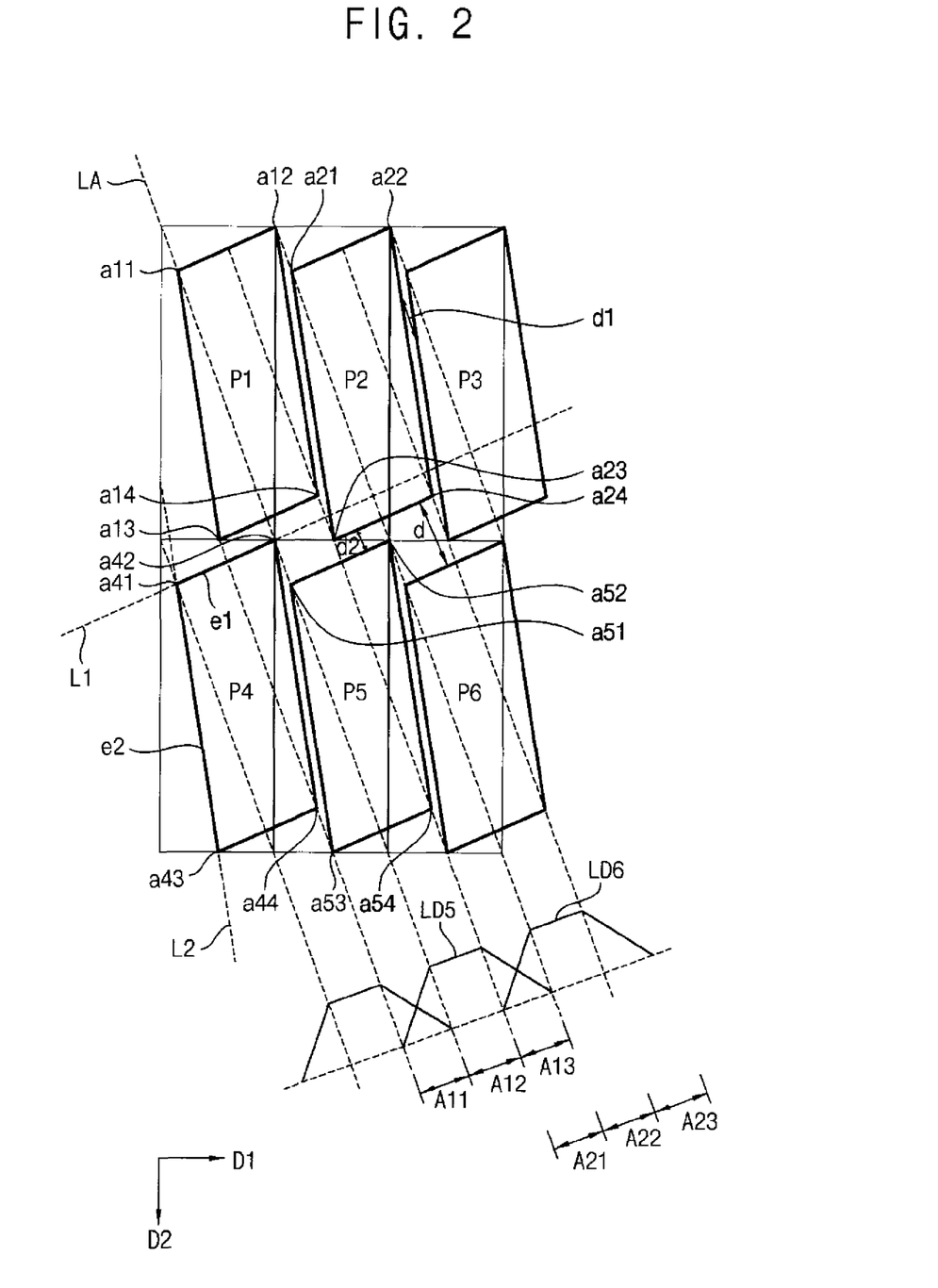
FIG. 2 is a plan view illustrating a display panel as shown in FIG. 1.
Figure 3:
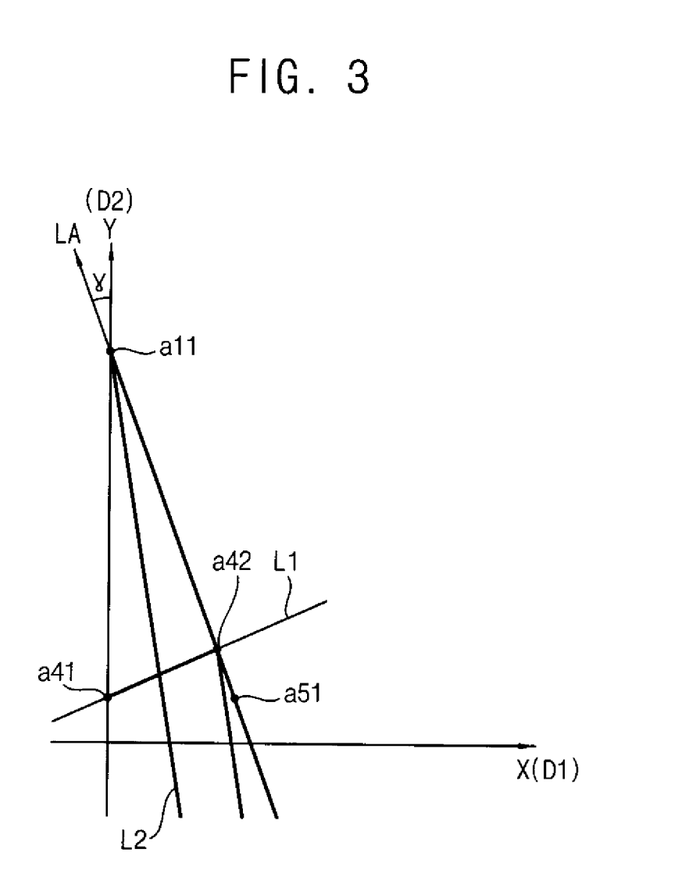
FIG. 3 is a diagram illustrating an arrangement of a pixel-transmit portion as shown in FIG. 2.

FIG. 2 is a plan view illustrating a display panel as shown in FIG. 1. FIG. 3 is a diagram illustrating an arrangement of a pixel-transmit portion as shown in FIG. 2.

Referring to FIGS. 2 and 3, according to an exemplary embodiment of the present invention, a plurality of pixel-transmit portions P may be arranged in a matrix type, which includes a plurality of rows and a plurality of columns.

For example, a first row includes a first pixel-transmit portion P1, a second pixel-transmit portion P2, and a third pixel-transmit portion P2, and a second row includes a fourth pixel-transmit portion P4, a fifth pixel-transmit portion P5, and a sixth pixel-transmit portion P6.

The first to sixth pixel-transmit portions P1, P2, . . . , P6 are included in a first column, a second column, and a third column. As shown in FIG. 2, the first column includes the first and fourth pixel-transmit portions P1 and P4, the second column includes the second and fifth pixel-transmit portions P2 and P5, and the third column includes the third and sixth pixel-transmit portions P3 and P6.

Each of the pixel-transmit portions, for example, the fourth pixel-transmit portion P4, includes a pair of shorter sides e1 parallel with each other and a pair of longer sides e2 parallel with each other. A shorter side e1 is positioned on a first line L1 which has an inclination direction opposite to the inclination direction of the lens axis LA with respect to the vertical-axis direction Y. A longer side e2 is positioned on a second line L2 which has an inclination direction substantially the same as the inclination direction of the lens axis LA with respect to the vertical-axis direction Y. An inclination angle of the second line L2 inclined with respect to the vertical-axis direction Y is less than an inclination angle γ of the lens axis LA inclined with respect to the vertical-axis direction Y.

Each of the pixel-transmit portions includes four vertices where the shorter sides e1 and the longer sides e2 meet each other. In an exemplary embodiment of the present invention, each pixel-transmit portion includes first and second vertices which are arranged from left to right and third and fourth vertices which are arranged from left to right.

For example, a first pixel-transmit portion P1 includes a first vertex a11, a second vertex a1t, a third vertex a13, and a fourth vertex a14. A second pixel-transmit portion P2 includes a first vertex a21, a second vertex a22, a third vertex a23, and a fourth vertex a24. A fourth pixel-transmit portion P4 includes a first vertex a41, a second vertex a42, a third vertex a43, and a fourth vertex a44. A fifth pixel-transmit portion P5 includes a first vertex a51, a second vertex a52, a third vertex a53, and a fourth vertex a54.

Two vertices of two pixel-transmit portions adjacent to each other in a first direction D1 are positioned on an inclination line parallel with the lens axis LA. For example, in a first row, the second vertex a12 of the first pixel-transmit portion P1 and the first vertex a21 of the second pixel-transmit portion P2, which is adjacent to the first pixel-transmit portion P1 in the first direction D1, are positioned on an inclination line parallel with the lens axis LA.

Two vertices of two pixel-transmit portions adjacent to each other in a second direction D2 are positioned on an inclination line parallel with the lens axis LA. For example, the first vertex a11 of the first pixel-transmit portion P1 in a first column and the second vertex a42 of the fourth pixel-transmit portion P4, which is adjacent to the first pixel-transmit portion P1 in the second direction D2, are positioned on an inclination line parallel with the lens axis LA.

A spacing distance along an extending direction of the lens axis between two adjacent pixel-transmit portions in the extending direction of the lens axis is substantially the same as a sum of a first spacing distance along the extending direction of the lens axis between two adjacent pixel-transmit portions in the first direction D1 (horizontal-axis direction X) and a second spacing distance along the extending direction of the lens axis between two adjacent pixel-transmit portions in the second direction D2 (vertical-axis direction Y).

For example, a spacing distance d along an extending direction of the lens axis between the second pixel-transmit portion P2 and the sixth pixel-transmit portion P6 adjacent to the second pixel-transmit portion P2 in the extending direction of the lens axis is substantially the same as a sum of a first spacing distance d1 along the extending direction of the lens axis between the second pixel-transmit portion P2 and the third pixel-transmit portion P3 adjacent to the second pixel-transmit portion P2 in the first direction D1 (horizontal-axis direction X) and a second spacing distance d2 along the extending direction of the lens axis between the second pixel-transmit portion P2 and the fifth pixel-transmit portion P5 adjacent to second pixel-transmit portion P2 in the second direction D2 (vertical-axis direction Y).

As shown in FIG. 2, the fifth pixel-transmit portion P5 displays a first viewing-point image. A luminance distribution LD5 of the fifth pixel-transmit portion P5 may be divided into first, second and third areas A11, A12, and A13, by the unit lens UL having the lens axis LA.

In the first area A11 of the fifth pixel-transmit portion P5, the luminance gradually increases to a maximum level due to the light blocking portion B. In the second area A12 of the fifth pixel-transmit portion P5, the luminance is in the maximum level. In the third area A13 of the fifth pixel-transmit portion P5, the luminance gradually decreases from the maximum level due to the light blocking portion B.

In the first area A11, a crosstalk may occur due to a second viewing-point image displayed on the fourth pixel-transmit portion P4 adjacent to the fifth pixel-transmit portion P5 at a left side of the fifth pixel-transmit portion P5, and in the third area A13, a crosstalk may occur due to a third viewing-point image displayed on the sixth pixel-transmit portion P6 adjacent to the fifth pixel-transmit portion P5 on a right side of the fifth pixel-transmit portion P5. However, the second area A12 may display the first viewing-point image without crosstalk.

According to an exemplary embodiment of the present invention, the second area A12 of the fifth pixel-transmit portion is equal to or more than about 50% of the entire fifth pixel-transmit portion, and may display a viewing-point image without crosstalk.

In view of a uniform luminance, the sixth pixel-transmit portion P6 display a third viewing-point image. A luminance distribution LD6 of the sixth pixel-transmit portion P6 may be divided into first, second and third areas A21, A22 and A23, by the unit lens UL having the lens axis LA.

In the first area A21 of the sixth pixel-transmit portion P6, the luminance gradually increases to a maximum level due to the light blocking portion B. In the second area A22 of sixth pixel-transmit portion P6, the luminance is in the maximum level. In the third area A33 of the sixth pixel-transmit portion P6, the luminance gradually decreases from the maximum level due to the light blocking portion B.

The third area A13 of the fifth pixel-transmit portion P5 overlaps the first area A21 of the sixth pixel-transmit portion P6. In the third area A13 of the fifth pixel-transmit portion P5, the luminance gradually decreases, but in the first area A21 of the sixth pixel-transmit portion P6, the luminance gradually increases. Thus, the overall luminance may be uniformly distributed in the third area A13 of the fifth pixel-transmit portion P5 or in the first area of A21 of the sixth pixel-transmit portion P6.

According to an exemplary embodiment of the present invention, the second area A12 of the fifth pixel-transmit portion P5 is equal to or more than about 50% of the entire fifth pixel-transmit portion, and may display a viewing-point image without crosstalk. The luminance of an entire display panel may be uniformly distributed.

Figure 4:
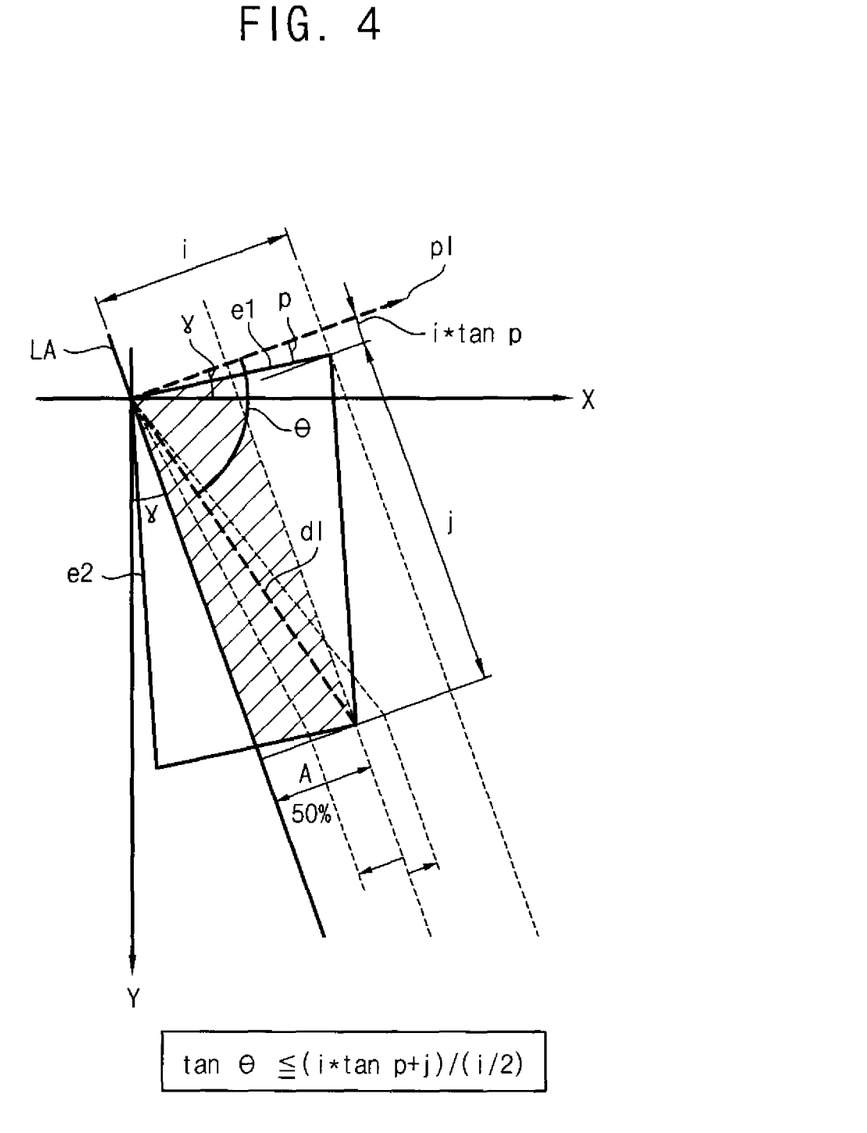
FIG. 4 is a diagram illustrating a pixel-transmit portion as shown in FIG. 2 according to an exemplary embodiment of the present invention.

FIG. 4 is a diagram illustrating a pixel-transmit portion as shown in FIG. 2 according to an exemplary embodiment of the present invention.

Referring to FIGS. 2 and 4, according to an exemplary embodiment, the pixel-transmit portion P may be determined by Equation 1 as follows:

$$\tan\theta \leq \frac{i\tan p + j}{\frac{i}{2}} \qquad \text{[Equation 1]}$$

Here, $\theta$ is an angle between a vertical line p1 perpendicular to the lens axis LA and a diagonal line d1 of the pixel-transmit portion.

j is a distance between two lines parallel to the vertical line p1 and passing through two adjacent vertices, respectively, of the pixel-transmit portion P measured along the direction of the lens axis LA and is referred to as a "first distance." i is a distance between the lens axis LA and a line parallel to the lens axis LA and passing through a vertex of the pixel-transmit portion P measured along a direction perpendicular to the direction of the lens axis LA and is referred to as a "second distance." p is an angle between the vertical line p1 and a shorter side e1 of the pixel-transmit portion P. According to an exemplary embodiment of the present invention, an inclination angle of the shorter side e1 has a negative angle with respect to the vertical line p1.

When the angle $\theta$ of the diagonal d1 increases, a normal area A in which a viewing-point image without the crosstalk is observed decreases. When the angle $\theta$ of the diagonal d1 decreases, the normal area A increases.

According to an exemplary embodiment of the present invention, as determined by Equation 1, as the angle $\theta$ of the diagonal d1 is less than a reference angle at which the normal area A is about 50% of the entire pixel-transmit portion, the normal area A without crosstalk may be increased. Thus, the luminance of the 3D image may be increased.

Figure 5:
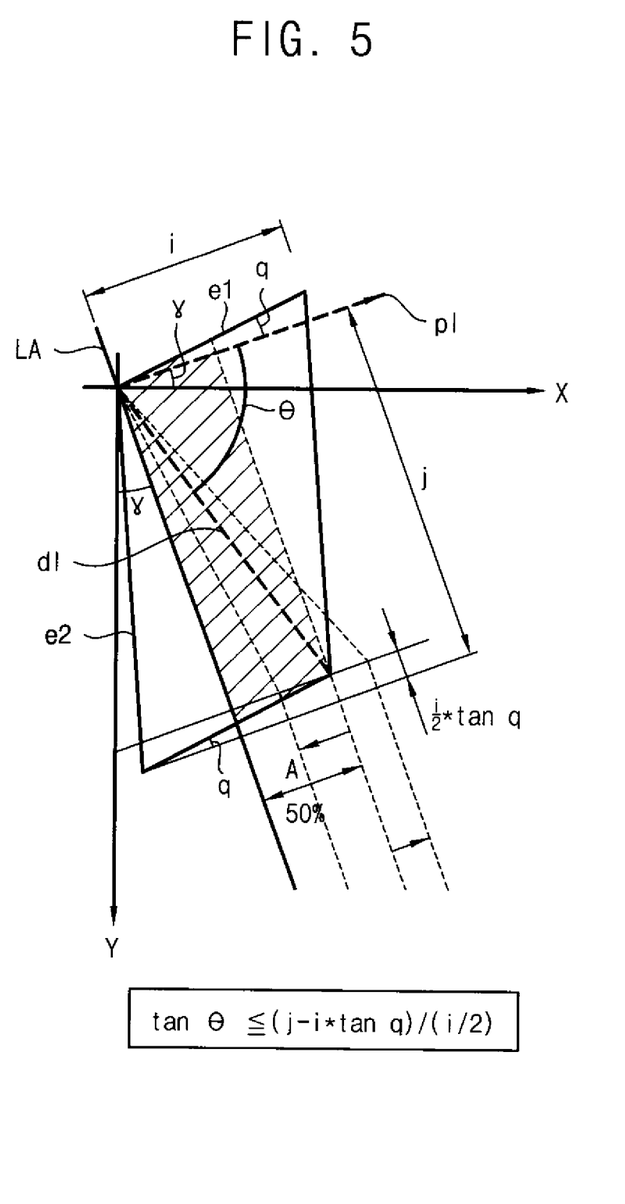
FIG. 5 is a diagram illustrating a pixel-transmit portion as shown in FIG. 2 according to an exemplary embodiment of the present invention.

FIG. 5 is a diagram illustrating a pixel-transmit portion as shown in FIG. 2 according to an exemplary embodiment of the present invention.

Referring to FIGS. 2 and 5, according to an exemplary embodiment, the pixel-transmit portion P may be determined by Equation 2 as follows:

$$\tan\theta \le \frac{j - i\tan q}{\frac{i}{2}} \qquad \text{[Equation 2]}$$

Here, θ is an angle between a vertical line p1 perpendicular to the lens axis LA and a diagonal d1 of the pixel-transmit portion.

j is a distance between the vertical line p1 and a line parallel to the vertical line p1 and passing through a vertex of the pixel-transmit portion P measured along the direction of the lens axis LA and is referred to as a "first distance." i is a distance between the lens axis LA and a line parallel to the lens axis LA and passing through a vertex of the pixel-transmit portion P measured along a direction perpendicular to the direction of the lens axis LA. q is an angle between from a shorter side e1 of the pixel-transmit portion P and the vertical line p1. According to an exemplary embodiment of the present invention, an inclination angle of the shorter side e1 has a positive angle with respect to the vertical line p1.

According to an exemplary embodiment of the present invention, as determined by Equation 2, when the angle θ of the diagonal d1 is less than a reference angle at which the normal area A is about 50% of the entire pixel-transmit portion, the normal area A without crosstalk may be increased. Thus, the luminance of the 3D image may be increased.

Figure 6:
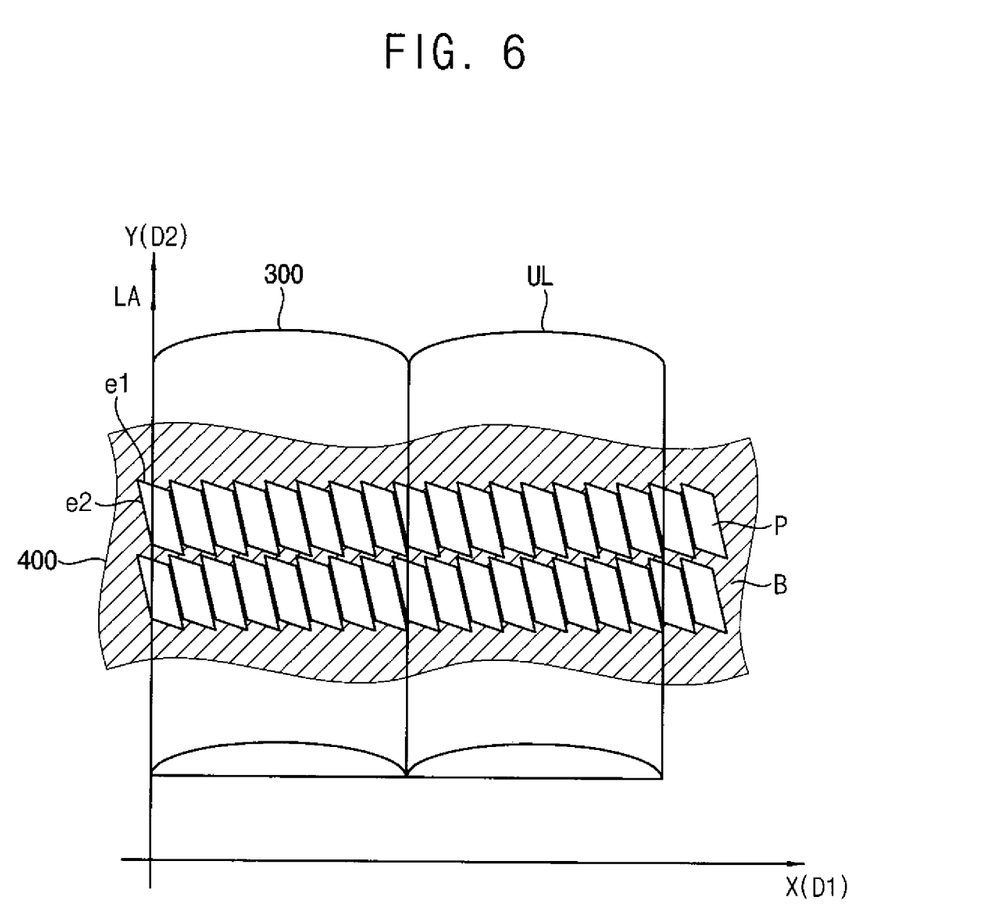
FIG. 6 is a perspective view illustrating a display apparatus according to an exemplary embodiment of the present invention.

FIG. 6 is a perspective view illustrating a display apparatus according to an exemplary embodiment of the present invention.

Referring to FIG. 6, the display apparatus may include a lens panel 300 and a display panel 400.

The lens panel 300 is disposed on the display panel 400 and includes a plurality of unit lenses UL. Each of the unit lenses UL extends along an extending direction of a lens axis LA that is substantially the same as a vertical-axis direction Y, and the unit lenses UL are arranged along a horizontal-axis direction X crossing the vertical-axis direction Y.

Each unit lens UL has a lens width, and the lens width corresponds to a plurality of pixel-transmit portions having a preset multi-viewing point. The unit lens UL refracts light passing through the pixel-transmit portions of the display panel 400 to positions corresponding to the multi-viewing point. The unit lens UL may include a Fresnel lens, a lenticular lens and so on.

The lens panel 300 may be a lens plate formed by patterning the unit lenses UL. Alternatively, the lens panel 300 may be an active liquid crystal ("LC") lens panel including a plurality of patterned electrodes and a liquid crystal layer for forming the unit lenses UL.

When the lens panel 300 is the lens plate, the display apparatus may display a three-dimensional ("3D") image. When the lens panel 300 is the active LC lens panel, the display apparatus controls the active LC lens panel to selectively display a two-dimensional ("2D") image and a 3D image.

The display panel 400 may include a plurality of pixel-transmit portions P and a blocking portion B surrounding each of the pixel-transmit portions P. A pixel-transmit portion P corresponds to an area where a pixel electrode is disposed and controls a transmittance of light provided from a rear surface of the display panel 400 based on a data voltage applied to the pixel electrode. The blocking portion B blocks the light provided from a rear surface of the display panel 400.

The blocking portion B includes at least one electronic element and at least one signal line to drive the pixel electrode. The electronic element may include a switching element, a storage capacitor and so on, and the signal line may include a data line, a gate line and so on. Alternatively, the transmit-control portion and the light blocking portion include at least one electronic element and at least one signal line.

Each of the pixel-transmit portions P includes a pair of first sides e1 parallel with each other and a pair of second sides e2 parallel with each other, and may have a parallelogrammic shape. The first sides extend along a direction inclined with respect to a horizontal-axis direction D1, and the second sides extend along a direction crossing the direction of the first sides and are inclined with respect to a vertical-axis direction D2.

The first sides e1 and the second sides e2 have an inclination direction inclined in a counterclockwise direction or in a clockwise direction with respect to the vertical-axis direction Y or the lens axis LA.

For example, as shown in FIG. 6, the first sides e1 are inclined in the counterclockwise direction with respect to the vertical-axis direction Y or the lens axis LA. The second sides e2 are inclined in the counterclockwise direction with respect to the vertical-axis direction Y or the lens axis LA.

Each of the first and second sides e1 and e2 may have an inclination direction inclined in the clockwise direction with respect to the vertical-axis direction Y. Hereinafter, the first side e1 may be referred to as a shorter side of the pixel-transmit portion P, and the second side e2 may be referred to as a longer side of the pixel-transmit portion P.

Figure 7:
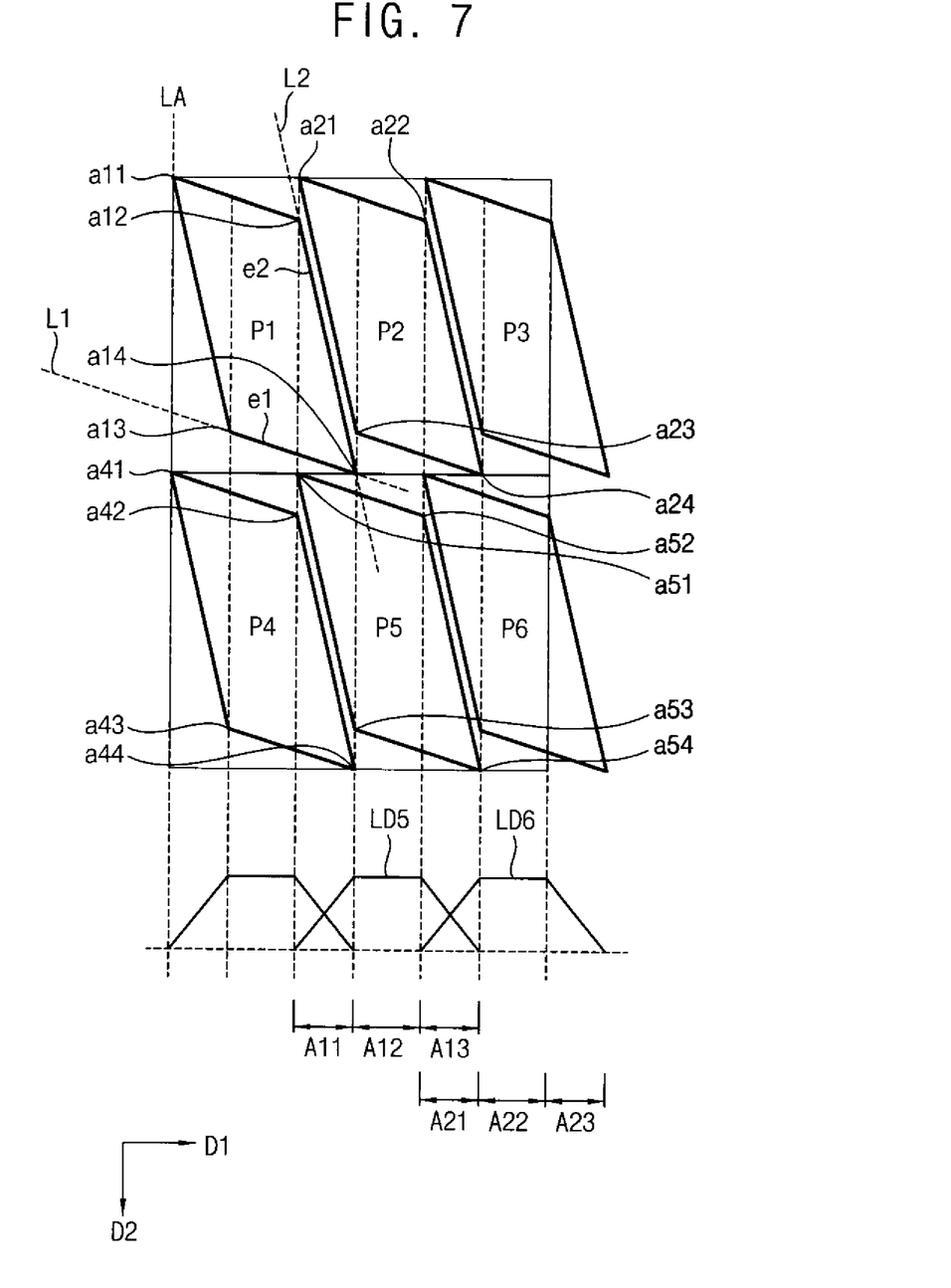
FIG. 7 is a plan view illustrating a display panel as shown in FIG. 6.
Figure 8:
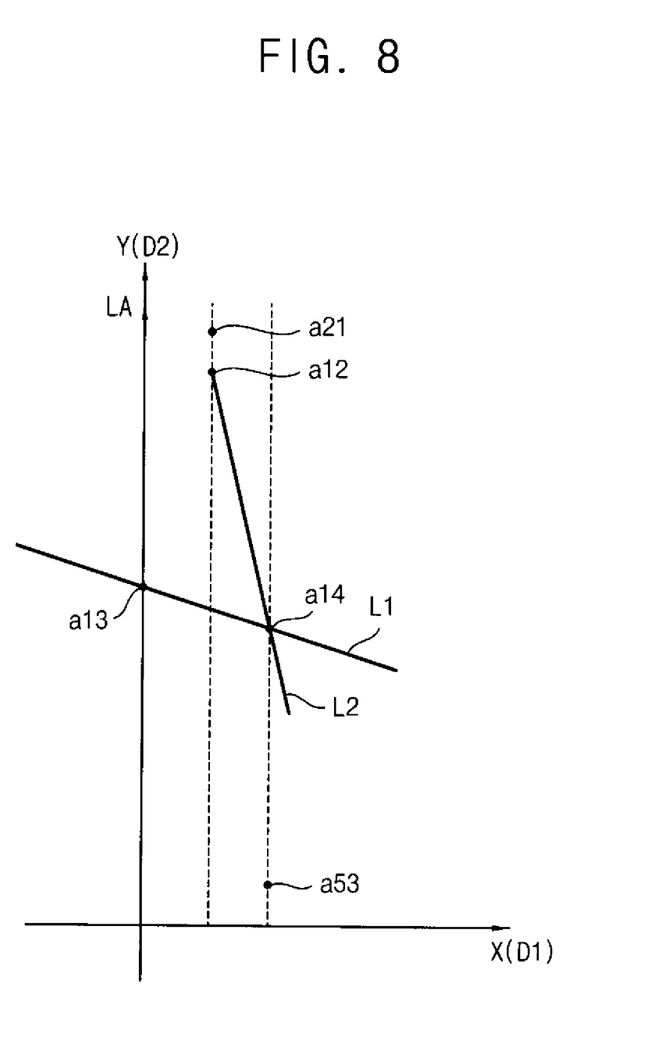
FIG. 8 is a diagram illustrating an arrangement of a pixel-transmit portion as shown in FIG. 7.

FIG. 7 is a plan view illustrating a display panel as shown in FIG. 6. FIG. 8 is a diagram illustrating an arrangement of a pixel-transmit portion as shown in FIG. 7.

Referring to FIGS. 7 and 8, according to an exemplary embodiment of the present invention, a plurality of pixel-transmit portions P may be arranged in a matrix type, which includes a plurality of rows and a plurality of columns.

For example, a first row includes a first pixel-transmit portion P1, a second pixel-transmit portion P2, and a third pixel-transmit portion P2, and a second row includes a fourth pixel-transmit portion P4, a fifth pixel-transmit portion P5, and a sixth pixel-transmit portion P6.

The first to sixth pixel-transmit portions P1, P2, . . . , P6 are included in a first column, a second column, and a third column As shown in FIG. 2, for example, a first column includes the first and fourth pixel-transmit portions P1 and P4, a second column includes the second and fifth pixel-transmit portions P2 and 125, and a third column includes the third and sixth pixel-transmit portions P3 and P6.

Each of the pixel-transmit portions, for example, the first pixel-transmit portion P1 includes a pair of shorter sides e1 parallel with each other and a pair of longer sides e2 parallel with each other. A shorter side e1 is positioned on a first line L1 which is inclined with respect to the horizontal-axis direction X. The longer side e2 is positioned on a second line L2 which is inclined with respect to the vertical-axis direction Y that is substantially the same as the direction of the lens axis LA.

Each of the pixel-transmit portions includes four vertices where the shorter sides e1 and the longer sides e2 meet each other. According to an exemplary embodiment of the present invention, each pixel-transmit portion includes first and second vertices which are arranged from left to right and third and fourth vertices which are arranged from left to right. The first, second third, and fourth vertices, respectively, are positioned on lines which are parallel with the vertical-axis direction Y that is substantially the same as the direction of the lens axis LA.

For example, a first pixel-transmit portion P1 includes a first vertex a11, a second vertex a12, a third vertex a13, and a fourth vertex a14. A second pixel-transmit portion P2 includes a first vertex a21, a second vertex a22, a third vertex a23, and a fourth vertex a24. A fourth pixel-transmit portion P4 includes a first vertex a41, a second vertex a42, a third vertex a43, and a fourth vertex a44. A fifth pixel-transmit portion P5 includes a first vertex a51, a second vertex a52, a third vertex a53, and a fourth vertex a54.

Two vertices of two pixel-transmit portions adjacent to each other in the first direction D1 are positioned on a line parallel with the lens axis LA that is substantially the same as the vertical-axis direction Y. For example, in a first row, the second vertex a12 of the first pixel-transmit portion P1 and the first vertex a21 of the second pixel-transmit portion P2 adjacent to the first pixel-transmit portion P1 in the first direction D1, are positioned on a line parallel with the lens axis LA.

Eight vertices of two pixel-transmit portions adjacent to each other in a second direction D2 are positioned on lines parallel with the lens axis LA that is substantially the same as the vertical-axis direction Y. For example, in the first column, the first vertex a11 of the first pixel-transmit portion P1 and the first vertex a41 of the fourth pixel-transmit portion P4 adjacent to the first pixel-transmit portion P1 in the second direction D2, are positioned on a line parallel with the lens axis LA parallel with the lens axis LA. The second vertex a12 of the first pixel-transmit portion P1 and the second vertex a42 of the fourth pixel-transmit portion P4 adjacent to the first pixel-transmit portion P1 in the second direction D2, are positioned on a line parallel with the lens axis LA parallel with the lens axis LA. The third vertex a13 of the first pixel-transmit portion P1 and the third vertex a43 of the fourth pixel-transmit portion P4 adjacent to the first pixel-transmit portion P1 in the second direction D2, are positioned on a line parallel with the lens axis LA parallel with the lens axis LA. The fourth vertex a14 of the first pixel-transmit portion P1 and the fourth vertex a44 of the fourth pixel-transmit portion P4 adjacent to the first pixel-transmit portion P1 in the second direction D2, are positioned on a line parallel with the lens axis LA parallel with the lens axis LA.

As shown in FIG. 7, the fifth pixel-transmit portion P5 displays a first viewing-point image. A luminance distribution LD5 of the fifth pixel-transmit portion P5 may be divided into first, second, and third areas A11, A12 and A13, by the unit lens UL having the lens axis LA.

In the first area A11 of the fifth pixel-transmit portion P5, the luminance gradually increases to a maximum level due to the light blocking portion B. In the second area A12 of the fifth pixel-transmit portion P5, the luminance is in the maximum level. In the third area A13 of the fifth pixel-transmit portion P5, the luminance gradually decreases from the maximum level due to the light blocking portion B.

In the first area A11, a crosstalk may occur due to a second viewing-point image displayed on the fourth pixel-transmit portion P4 adjacent to the fifth pixel-transmit portion P5 at a left side of the fifth pixel-transmit portion P5, and in the third area A13, a crosstalk may occur due to a third viewing-point image displayed on the sixth pixel-transmit portion P6 adjacent to the fifth pixel-transmit portion P5 at a right side of the fifth pixel-transmit portion P5. However, the second area A12 may display the first viewing-point image without crosstalk.

According to an exemplary embodiment of the present invention, the second area A12 of the fifth pixel-transmit portion is equal to or more than about 50% of the entire fifth pixel-transmit portion, and may display a viewing-point image without crosstalk.

In view of a uniform luminance, the sixth pixel-transmit portion P6 display a third viewing-point image. A luminance distribution LD6 of the sixth pixel-transmit portion P6 may be divided into first, second and third areas A21, A22 and A23, by the unit lens UL having the lens axis LA.

In the first area A21 of the sixth pixel-transmit portion P6, the luminance gradually increases to a maximum level due to the light blocking portion B. In the second area A22 of sixth pixel-transmit portion P6, the luminance is in the maximum level. In the third area A33 of the sixth pixel-transmit portion P6, the luminance gradually decreases from the maximum level due to the light blocking portion B.

The third area A13 of the fifth pixel-transmit portion P5 overlaps the first area A21 of the sixth pixel-transmit portion P6. In the third area A13 of the fifth pixel-transmit portion P5, the luminance gradually decreases, but in the first area A21 of the sixth pixel-transmit portion P6, the luminance gradually increases. Thus, the overall luminance may be uniformly distributed in the third area A13 of the fifth pixel-transmit portion P5 or in the first area of A21 of the sixth pixel-transmit portion P6.

According to an exemplary embodiment of the present invention, the second area A12 of the fifth pixel-transmit portion P5 is equal to or more than about 50% of the entire fifth pixel-transmit portion, and may display a viewing-point image without crosstalk. The luminance of an entire display panel may be uniformly distributed.

Figure 9:
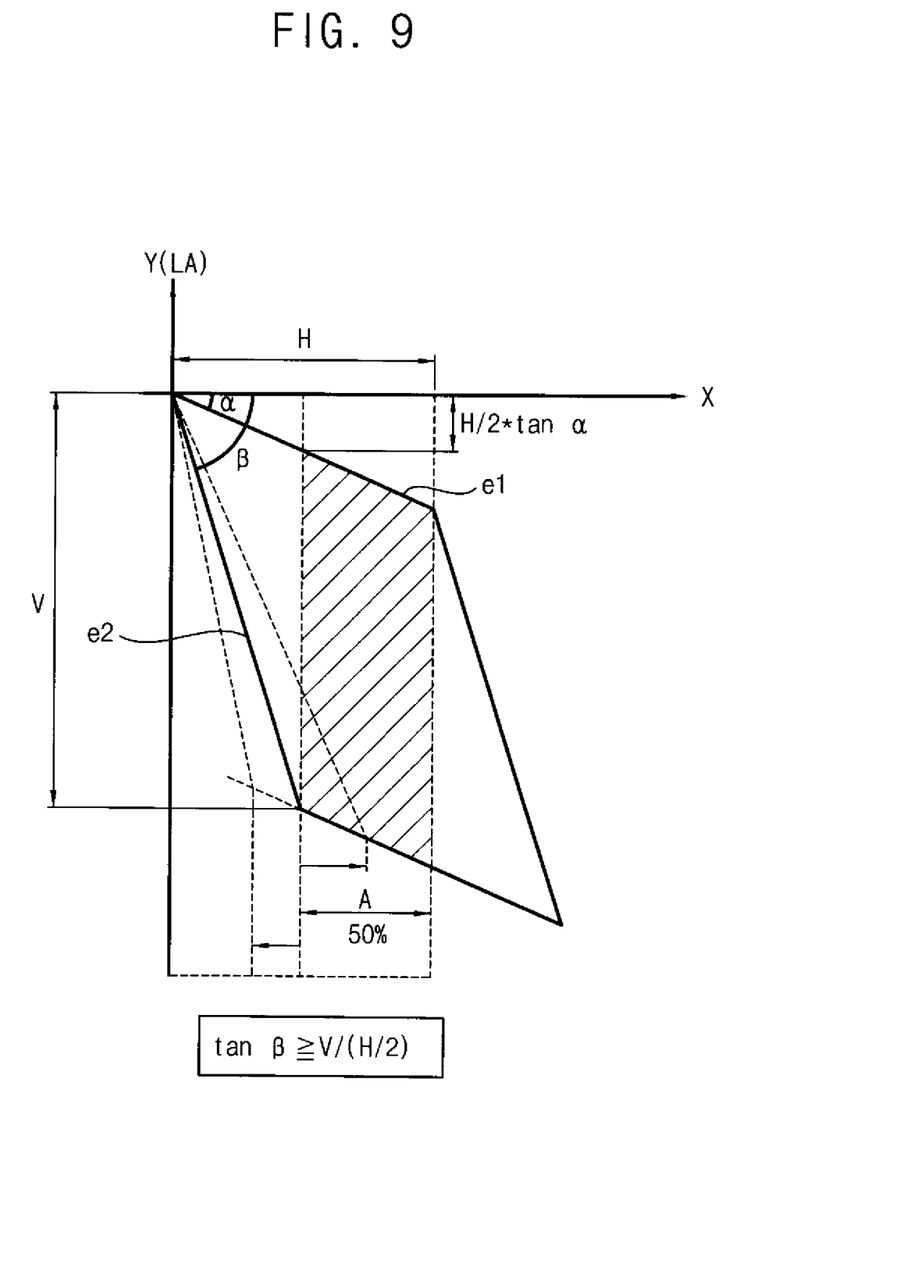
FIG. 9 is a diagram illustrating a pixel-transmit portion as shown in FIG. 7 according to an exemplary embodiment of the present invention.

FIG. 9 is a diagram illustrating a pixel-transmit portion as shown in FIG. 7 according to an exemplary embodiment of the present invention.

Referring to FIGS. 7 and 9, according to an exemplary embodiment, the pixel-transmit portion P may be determined by Equation 3 as follows:

$$\tan\beta \geq \frac{V}{\frac{H}{2}} \qquad \text{[Equation 3]}$$

Here, β is an angle between the horizontal-axis direction X and a longer side e2 of the pixel-transmit portion. H is a distance between the lens axis LA and a line parallel to the lens axis LA and passing through a vertex of the pixel-transmit portion P measured along the horizontal-axis direction X and is referred to as a "first distance." V is a distance between the horizontal axis X and a line parallel to the horizontal axis X and passing through a vertex of the pixel-transmit portion P measured along a vertical-axis direction Y or the direction of the lens axis LA and is referred to as a "second distance." α is an angle between the horizontal-axis direction X and a shorter side e1 of the pixel-transmit portion P. According to an exemplary embodiment of the present invention, an inclination angle of the shorter side e1 has a negative angle with respect to the vertical line p1.

According to an exemplary embodiment of the present invention, as determined by Equation 3, as the angle β of the longer side e2 increases, a normal area A in which a viewing-point image without crosstalk is observed decreases. However, the angle β of the longer side e2 decreases, the normal area A increases.

According to an exemplary embodiment of the present invention, as determined by Equation 3, as the angle β of the longer side e2 is less than a reference angle at which the normal area A is about 50% of the entire pixel-transmit portion, the normal area A without crosstalk may be increased. Thus, the luminance of the 3D image may be increased.

According to exemplary embodiments of the present invention, the display panel including the pixel-transmit portions may increase the normal area without crosstalk so that the display quality of the 3D image may be increased.

Although exemplary embodiments of the present invention include been described, it is understood that the present invention should not be limited to these exemplary embodiments and various changes and modifications can be made by one of ordinary skill in the art within the spirit and scope of the present invention as hereinafter claimed.

What is claimed is:

1. A display apparatus comprising:
a lens panel including a plurality of unit lenses; and
a display panel including a first pixel-transmit portion and a blocking portion, the first pixel-transmit portion including a pair of first sides inclined with respect to a horizontal-axis direction of the display panel and substantially parallel with each other, a pair of second sides inclined with respect to a vertical-axis direction of the display panel and substantially parallel with each other, and a first, a second, a third, and a fourth vertex, wherein the first pixel-transmit portion is configured to transmit light, and wherein the blocking portion surrounds the pixel-transmit portion and is configured to block the light;
a second pixel-transmit portion adjacent to the first pixel-transmit portion in the horizontal-axis direction, the second pixel-transmit portion including a pair of first sides, a pair of second sides, a first, a second, a third and a fourth vertex, and configured to transmit light;
a third pixel-transmit portion adjacent to the second pixel-transmit portion in the vertical-axis direction including a pair of first sides, a pair of second sides, a first, a second, a third and fourth vertex, and configured to transmit light, wherein a first inclination line, which is an imaginary line and inclined with respect to the vertical-axis direction, passes through the second vertex of the first pixel-transmit portion, the first vertex of the second pixel-transmit portion, a mid-portion of one of the first sides of the second pixel-transmit portion, and the second vertex of the third pixel-transmit portion,
wherein at least one of the unit lenses has lens axis inclined with respect to the vertical-axis direction, and the first inclination line is substantially parallel with the lens axis.

2. The display apparatus of claim 1, wherein at least one of the first sides of the first pixel-transmit portion has a first inclination direction opposite to a direction of the lens axis inclined with respect to the vertical-axis direction, and at least one of the second sides of the first pixel-transmit portion has a second inclination direction the same or substantially the same as the direction of the lens axis inclined with respect to the vertical-axis direction.

3. The display apparatus of claim 2, further comprising a fourth pixel-transmit portion adjacent to the first pixel-transmit portion in the vertical-axis direction and adjacent to the third pixel-transmit portion in the horizontal-axis direction, wherein the fourth pixel-transmit portion includes first, second, third, and fourth vertices, and wherein the first vertex of the first pixel-transmit portion and the second vertex of the fourth pixel-transmit portion are positioned on a second inclination line substantially parallel with the first inclination line.

4. The display apparatus of claim 3, wherein an angle (θ) between a vertical line perpendicular to the lens axis and a diagonal line of the first pixel-transmit portion is calculated by:

$$\tan\theta \le \frac{i\tan p + j}{\frac{i}{2}}$$

wherein j is a distance between two lines parallel to the vertical line and passing through the second and fourth vertices, respectively, of the first pixel-transmit portion measured along the lens axis, i is a distance between the lens axis and a line parallel to the lens axis and passing through the second vertex of the first pixel-transmit portion measured along a direction perpendicular to the lens axis, and p is an angle between the vertical line and one of the first sides of the first pixel-transmit portion.

5. The display apparatus of claim 3, wherein an angle (θ) between a vertical line perpendicular to the lens axis and a diagonal line of the first pixel-transmit portion is calculated by:

$$\tan\theta \le \frac{j - i\tan q}{\frac{i}{2}}$$

wherein j is a distance between the vertical line and a line parallel to the vertical line and passing through the third vertex of the first pixel-transmit portion measured along the lens axis, i is a distance between the lens axis and a line parallel to the lens axis and passing through the second vertex of the first pixel-transmit portion measured along a direction perpendicular to the lens axis, and q is an angle between the vertical line and one of the first sides of the first pixel-transmit portion.

6. The display apparatus of claim 3, wherein a spacing distance along a direction of the lens axis between the first pixel-transmit portion and a pixel-transmit portion adjacent to each other in the direction of the lens axis is substantially the same as a sum of a first spacing distance along the direction of the lens axis between the first and second pixel-transmit portions and a second spacing distance along the direction of the lens axis between the second and third pixel-transmit portions.

7. A display panel comprising:
a lens panel including a plurality of unit lenses, wherein a lens axis of at least one of the unit lenses is substantially parallel with the vertical-axis direction;
a first pixel-transmit portion corresponding to a pixel electrode, wherein the first pixel-transmit portion includes two parallel first sides, two parallel second sides, and a first, a second, a third, and a fourth vertex, wherein the first sides are inclined by a first angle with respect to a horizontal axis of the display panel, and the second sides are inclined by a second angle with respect to a vertical axis of the display panel;
a blocking portion surrounding the first pixel-transmit portion;

a second pixel-transmit portion adjacent to the first pixel-transmit portion in the horizontal-axis direction, the second pixel-transmit portion including a pair of first sides, a pair of second sides, and a first, a second, a third and a fourth vertex; and a third pixel-transmit portion adjacent to the first pixel-transmit portion in the vertical-axis direction, the third pixel-transmit portion including a pair of first sides, a pair of second sides, and a first, a second, a third and a fourth vertex, wherein a first vertical line substantially parallel with the vertical-axis direction passes through the first vertex of the second pixel-transmit portion, the second vertex of the first pixel transmit portion, a midportion of one of the first sides of the first pixel-transmit portion, and the second vertex of the third pixel transmit portion, wherein an angle (β) between the horizontal-axis direction and one of the second sides of the first pixel-transmit portion is calculated by:

$$\tan\beta \geq \frac{V}{\frac{H}{2}}$$

wherein H is a distance between the lens axis and a line parallel to the lens axis and passing through the second vertex of the first pixel-transmit portion measured along the horizontal-axis direction, and V is a distance between a horizontal axis and a line parallel to the horizontal axis and passing through the third vertex of the first pixel-transmit portion measured along the vertical-axis direction.

8. The display panel of claim 7, wherein a second vertical line parallel with the vertical-axis direction is parallel with the first vertical line and wherein the second vertical line passes through the first vertex of the first pixel-transmit portion and the first vertex of the third pixel-transmit portion.

* * * * *